United States Patent
Aguirre et al.

(10) Patent No.: US 9,661,687 B2
(45) Date of Patent: May 23, 2017

(54) COAXIAL CABLE INTERFACE TO OUTDOOR BROADBAND UNIT

(71) Applicant: Verizon Patent and Licensing Inc., Basking Ridge, NJ (US)

(72) Inventors: Sergio Aguirre, Southlake, TX (US); Raafat Edward Kamel, Little Falls, NJ (US); Lalit R. Kotecha, San Ramon, CA (US); Kamlesh S. Kamdar, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 446 days.

(21) Appl. No.: 14/250,510

(22) Filed: Apr. 11, 2014

(65) Prior Publication Data

US 2014/0219177 A1    Aug. 7, 2014

Related U.S. Application Data

(62) Division of application No. 13/069,503, filed on Mar. 23, 2011, now Pat. No. 8,718,085.

(51) Int. Cl.
| | |
|---|---|
| *H04W 92/04* | (2009.01) |
| *H04W 84/14* | (2009.01) |
| *H01Q 1/24* | (2006.01) |
| *H01Q 1/42* | (2006.01) |
| *H04W 88/16* | (2009.01) |
| *H01Q 1/22* | (2006.01) |

(52) U.S. Cl.
CPC .......... *H04W 92/045* (2013.01); *H01Q 1/241* (2013.01); *H01Q 1/246* (2013.01); *H01Q 1/42* (2013.01); *H04W 84/14* (2013.01); *H01Q 1/22* (2013.01); *H04W 88/16* (2013.01)

(58) Field of Classification Search
None
See application file for complete search history.

(56) References Cited

U.S. PATENT DOCUMENTS

| | | |
|---|---|---|
| 2005/0179607 A1 | 8/2005 | Gorsuch et al. |
| 2006/0229231 A1* | 10/2006 | Chen ................ C09K 8/68 510/499 |
| 2007/0173303 A1 | 7/2007 | Viorel et al. |
| 2007/0205955 A1 | 9/2007 | Korisch et al. |
| 2010/0192207 A1 | 7/2010 | Raleigh |
| 2010/0311321 A1 | 12/2010 | Norin |
| 2010/0313232 A1* | 12/2010 | Norin ................ H04H 20/63 725/110 |

* cited by examiner

Primary Examiner — Kwang B Yao
Assistant Examiner — Adam Duda

(57) ABSTRACT

A network device within an outdoor broadband unit receives, via Ethernet over coaxial cable signals, Internet Protocol (IP) data traffic originating from a device within a local area network (LAN). The IP data traffic is buffered in a memory within the outdoor broadband unit. A forwarding plane module of the network device sends the IP data traffic toward a destination via an air interface for a wide area network (WAN). The network device receives, via different Ethernet over coaxial cable signals, IP control traffic originating from the device within the LAN. A control plane module of the network device implements the instructions in the IP control traffic to initiate a test function for the network device.

20 Claims, 10 Drawing Sheets

FIG. 8

| LAN DEST. IP ADDRESS | LAN PORT | WAN DEST. IP ADDRESS | WAN PORT |
|---|---|---|---|
| | | | |
| | | | |
| ... | ... | ... | ... |

810 → LAN DEST. IP ADDRESS
820 → LAN PORT
830 → WAN DEST. IP ADDRESS
840 → WAN PORT
800

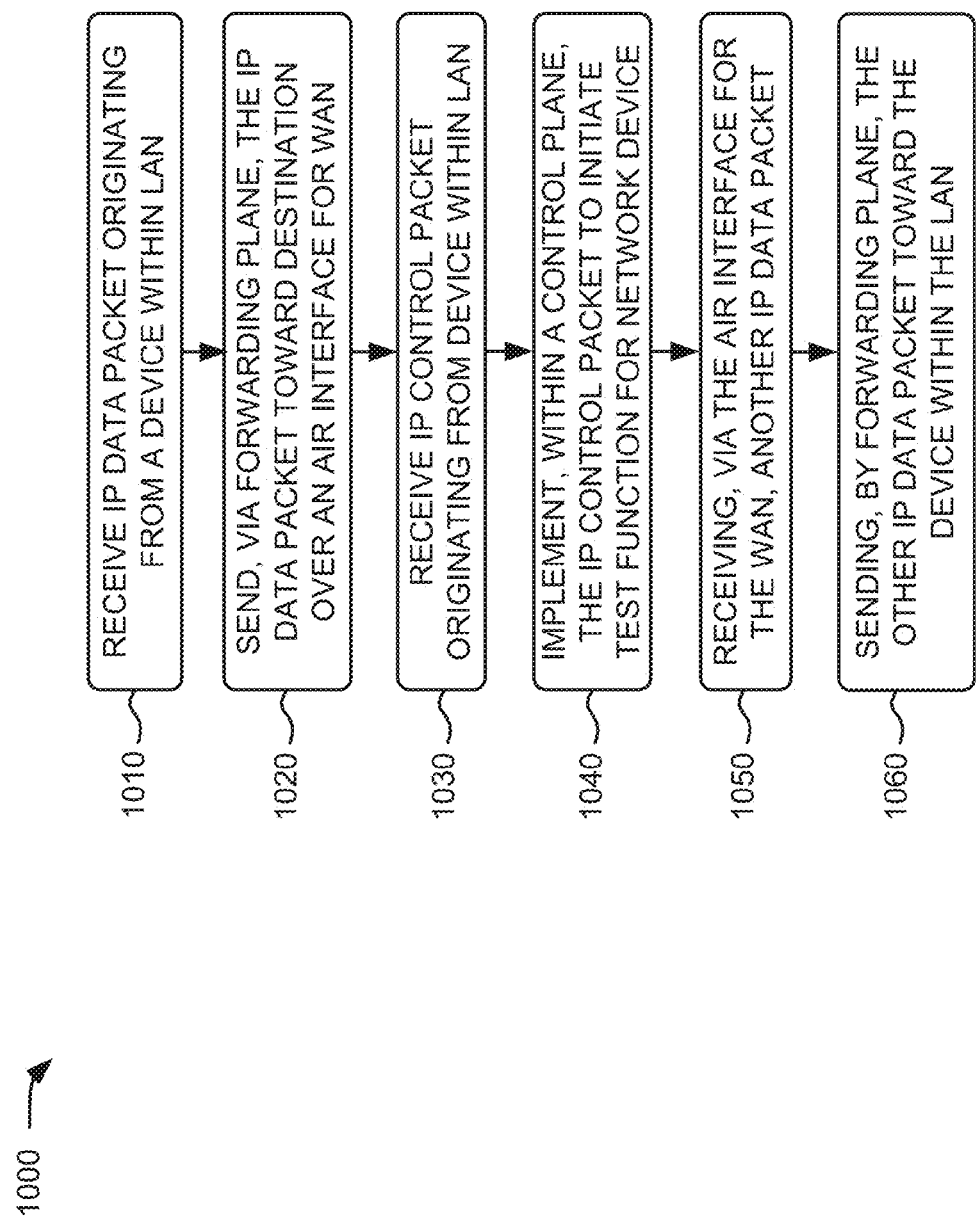

COAXIAL CABLE INTERFACE TO OUTDOOR BROADBAND UNIT

CROSS-REFERENCE TO RELATED APPLICATION

This application is a divisional of U.S. patent application Ser. No. 13/069,503, filed Mar. 23, 2011, the disclosure of which is hereby incorporated herein in its entirety.

BACKGROUND INFORMATION

Bundled media services (e.g., combination packages of television, telephone, and broadband Internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). Fixed wireless services can be made more attractive to customers by effectively leverage existing customer premises equipment (CPE).

BRIEF DESCRIPTION OF THE DRAWINGS

FIG. 8 is a diagram of an example portion of a routing table according to an implementation described herein;

FIG. 10 is a flow diagram illustrating a process for routing traffic between a WAN air interface and a LAN interface according to an implementation described herein.

DETAILED DESCRIPTION OF PREFERRED EMBODIMENTS

The following detailed description refers to the accompanying drawings. The same reference numbers in different drawings identify the same or similar elements.

Systems and/or methods described herein may include an outdoor broadband unit that implements full IP-based routing between a WAN-side interface (e.g., a Long-Term Evolution (LTE) air interface) and a LAN-side interface (e.g., a home network using standards of the Multimedia over Coax Alliance (MoCA)). The outdoor broadband unit may maintain a routing table for all connections through an internal routing system based on matching between WAN-side IP addresses and/or ports and LAN-side IP addresses and/or ports. The systems and/or methods may support both connection-oriented transport layer routing (such as Transmission Control Protocol (TCP)) and connectionless transport layer routing (such as User Datagram Protocol (UDP)).

In one implementation, the systems and/or methods may include a satellite antenna to receive communications from a satellite network, an outdoor broadband unit connected to an external portion of a customer premises, and a support arm to hold the outdoor broadband unit and the satellite antenna. The outdoor broadband unit may include a radio frequency (RF) antenna to receive communications from a LTE network, a LTE module to implement an air interface for the LTE network, a coaxial network controller to provide an interface to a LAN, associated with the customer premises, and a broadband home router to route traffic between the WAN and the LAN. The LTE module may include a control plane module to perform control operations relating to testing of the LTE module and a forwarding plane module. The broadband home router may transfer user data, from the LAN, to both the control plane module and the forwarding plane module of the LTE module.

Figure 1:
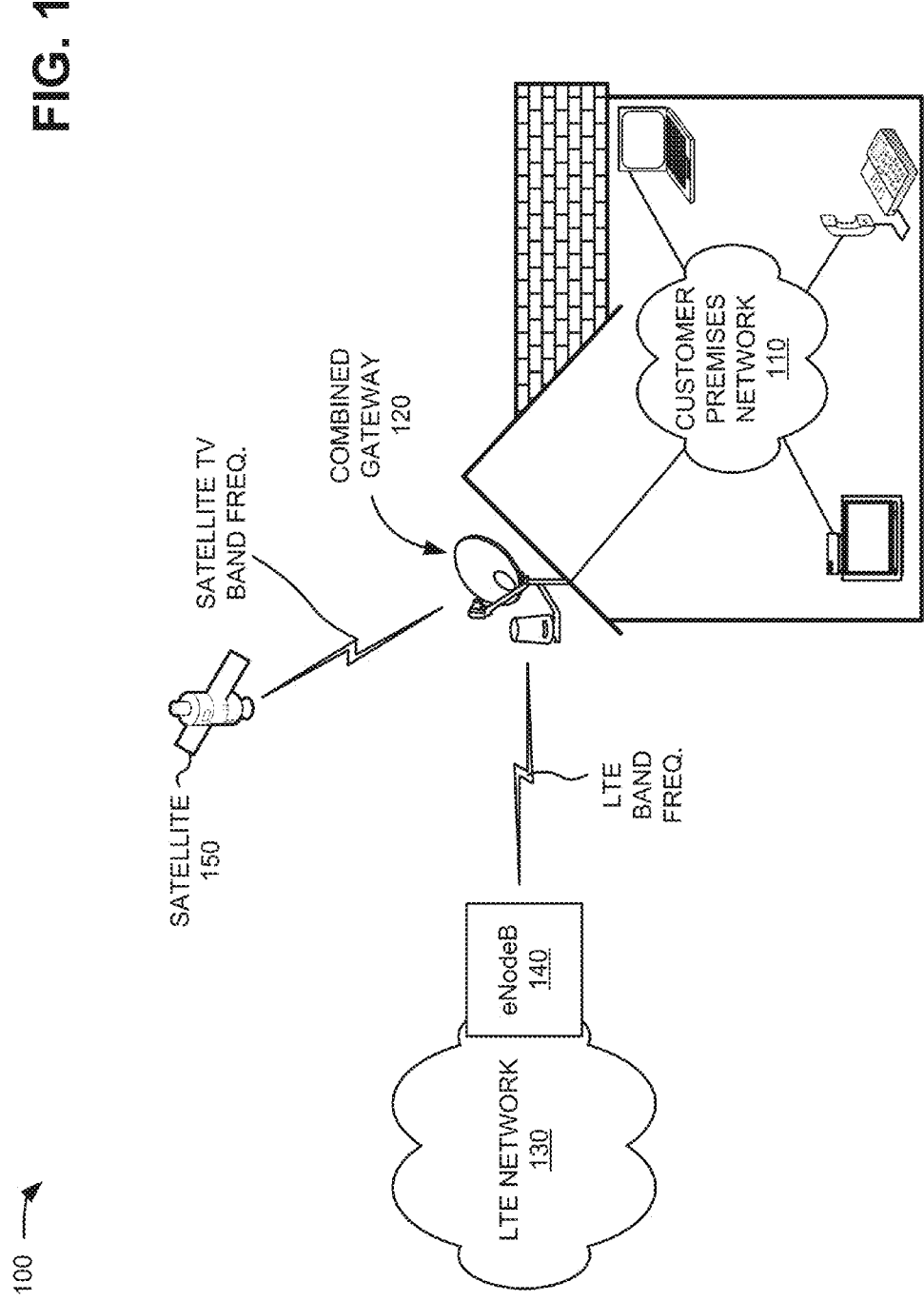
FIG. 1 is a diagram of a system according to an implementation described herein.

FIG. 1 is a diagram of a system 100 according to an implementation described herein. As shown in FIG. 1, system 100 may include customer premises network 110, gateway equipment 120, a LTE network 130, an eNodeB 140, and a satellite 150.

Customer premises network 110 may include one or more devices connected via a customer premises network. Devices in the customer premises network may include, for example, set-top boxes (STBs), televisions, computers, voice-over-Internet-protocol (VoIP) devices, home networking equipment (e.g., routers, cables, splitters, local gateways, etc.), gaming devices, etc. Devices within the customer premises network may be connected via wired connections (e.g., coaxial cable, Telecommunications Industry Association (TIA) category 5 ("Cat 5") cable, TIA Cat 3 cable, etc.) and/or wireless connections (e.g., using network devices such as those available under the IEEE 802.11 wireless local wireless network (LAN) standards). In the example shown in FIG. 1, customer premises network 110 is connected to eNodeB 140 through a two-way wireless connection (e.g., using a LTE band frequency) and connected to satellite network 150 through a one-way (e.g., downlink) wireless connection (e.g., using a satellite TV band frequency). The two-way wireless connection and the one-way wireless connection may be implemented using combined gateway equipment 120.

Combined gateway equipment 120, which is described in more detail below, may generally include mechanisms for communicating with satellite 150 (to provide satellite-based communications) and for communicating with eNodeB 140 (to provide terrestrial RF-based communications). Combined gateway equipment 120 may connect, such as via a coaxial connection, to devices inside of the customer premises, such as the devices connected to customer premises network 110.

LTE network 130 may include a core network architecture of the Third Generation Partnership Project (3GPP) LTE wireless communication standard (e.g., an evolved packet core (EPC) network). LTE network 130 may include a packet-switched core network that supports high-speed wireless and wireline broadband access technologies. Additionally, LTE network 130 may provide packet-switched voice services (e.g., which are traditionally circuit-switched) using an Internet Protocol Multimedia Subsystem Multimedia Subsystem (IMS) network (not shown in FIG. 1). LTE network 130 may include an Evolved NodeB (eNodeB) 140. In addition, LTE network 130 may include one or more other network devices (not shown), such as one or more mobility management entities (MMEs), serving gateways (SGWs), packet data network (PDN) gateways (PGW), and/or other devices.

eNodeB 140 may include a LTE base station that may cover a particular geographic area serviced by LTE network 130. eNodeB 140 may include one or more devices that receive information, such as voice, video, text, and/or other data, from network devices and/or that transmit the information to customer premises 110 via an air interface. eNodeB 140 may also include one or more devices that receive information from devices in customer premises 110 via an air interface and/or that transmit the information to other network devices.

Satellite 150 may provide multimedia content from, for example, a direct broadcast satellite (DBS) service provider (not shown in FIG. 1). Satellite 150 may provide a downlink signal over a designated satellite TV band frequency (e.g., in the range of 950 megahertz (MHz) to 2150 MHz). The downlink signal may be received using a satellite antenna/receiver system at customer premises 110 to present satellite TV content to a user.

In implementations described herein, customer premises network 110 may combine LTE functionality with satellite TV service. Using combined gateway equipment 120, both broadband (over LTE) service (e.g., via eNodeB 140) and satellite TV service (e.g., via satellite 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
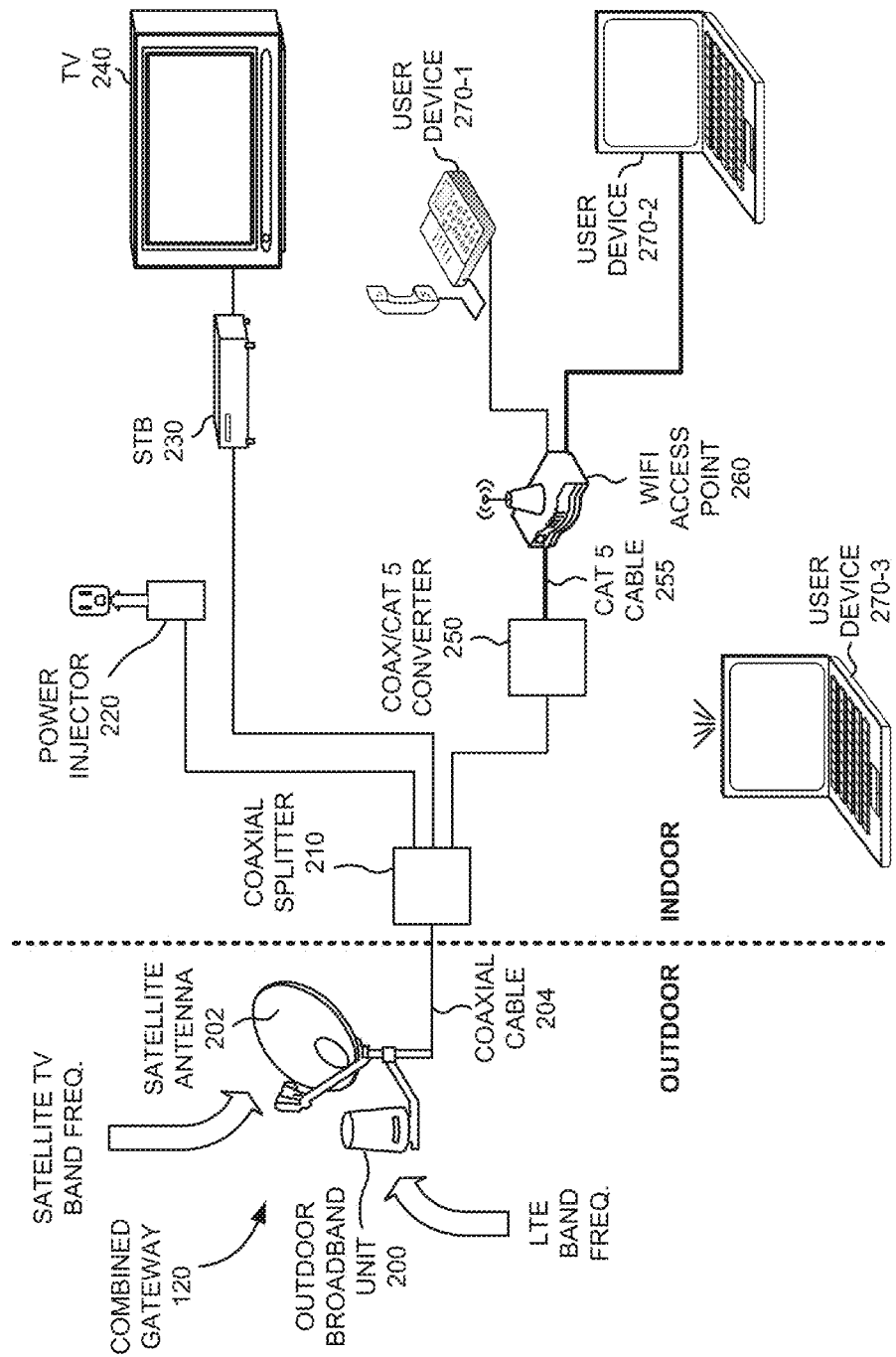
FIG. 2 is a diagram of a customer premises of FIG. 1 according to an implementation described herein.

FIG. 2 is a diagram of customer premises network 110 according to an implementation described herein. As illustrated, combined gateway equipment 120 of customer premises network 110 may include an outdoor broadband unit 200 and a satellite antenna 202. A coaxial cable 204 may connect combined gateway equipment 120 to the indoor portion of customer premises network 110. Customer premises network 110 may further include a coaxial splitter 210, a power injector 220, a set-top box (STB) 230, a television 240, a coax/Cat 5 converter 250, a local router 260, and user devices 270-1, 270-2, and 270-3 (referred to herein collectively as "user devices 270" or individually as "user device 270"). One outdoor broadband unit 200, one coaxial splitter 210, one power injector 220, one STB 230, one television 240, one coax/Cat 5 converter 250, one local router 260, and three user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, WiFi access points 260, and/or user devices 270.

Outdoor broadband unit 200 may include one or more data processing and/or data transfer devices, such as a gateway, a router, a modem, a switch, a firewall, a network interface card, a hub, a bridge, a proxy server, an optical add-drop multiplexer (OADM), and/or some other type of device that processes and/or transfers data. In one example, outdoor broadband unit 200 may include a wireless gateway that provides a convergence point between wireless protocols (e.g., associated with eNodeB 140) and IP protocols (e.g., associated with user devices 270). Outdoor broadband unit 200 may be physically deployed with satellite antenna 202 (e.g., on a roof or a side wall of a house associated with customer premises network 110) as part of combine gateway equipment 120. For example, outdoor broadband unit 200 may utilize a pre-existing or new satellite TV installation in a way that both broadband (over LTE) service and satellite TV are brought indoors (e.g., inside the customer premises) over, for example, a coaxial cable 204. Components of outdoor broadband unit 200 may also be powered using coaxial cable 204.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as the Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitter 210 may include splitting technologies to filter LTE and satellite TV signals. In one implementation, coaxial splitter 210 may include a SWiM splitter. For example, coaxial splitter 210 may facilitate allocating logical channels using different frequency blocks for viewer-selected television programming and broadband signals to SWiM-compatible STB 230 and/or Local router 260.

Power injector 220 may include a mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring. In one implementation, power injector 220 may include an on-off switch (or button).

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 adapter 250 may include a device to convert incoming signals from coaxial cables to outgoing signals on Cat 5 cables, such as cat 5 cable 255.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a USB Ethernet Router that is capable of meeting LTE quality of service (QoS) standards.

User devices 270 may include any device that is capable of communicating with customer premises network 110 via local router 260. For example, user device 270 may include a mobile computation and/or communication device, such as a laptop computer, a VoIP-enabled device, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a VoIP-enabled device phone base, a personal computer, a gaming system, etc.

Although FIG. 2 shows example components of customer premises network 110, in other implementations, customer premises network 110 may include fewer components, different components, differently arranged components, and/or additional components than those depicted in FIG. 2. Alternatively, or additionally, one or more components of customer premises network 110 may perform one or more tasks described as being performed by one or more other components of customer premises network 110.

Figure 3:
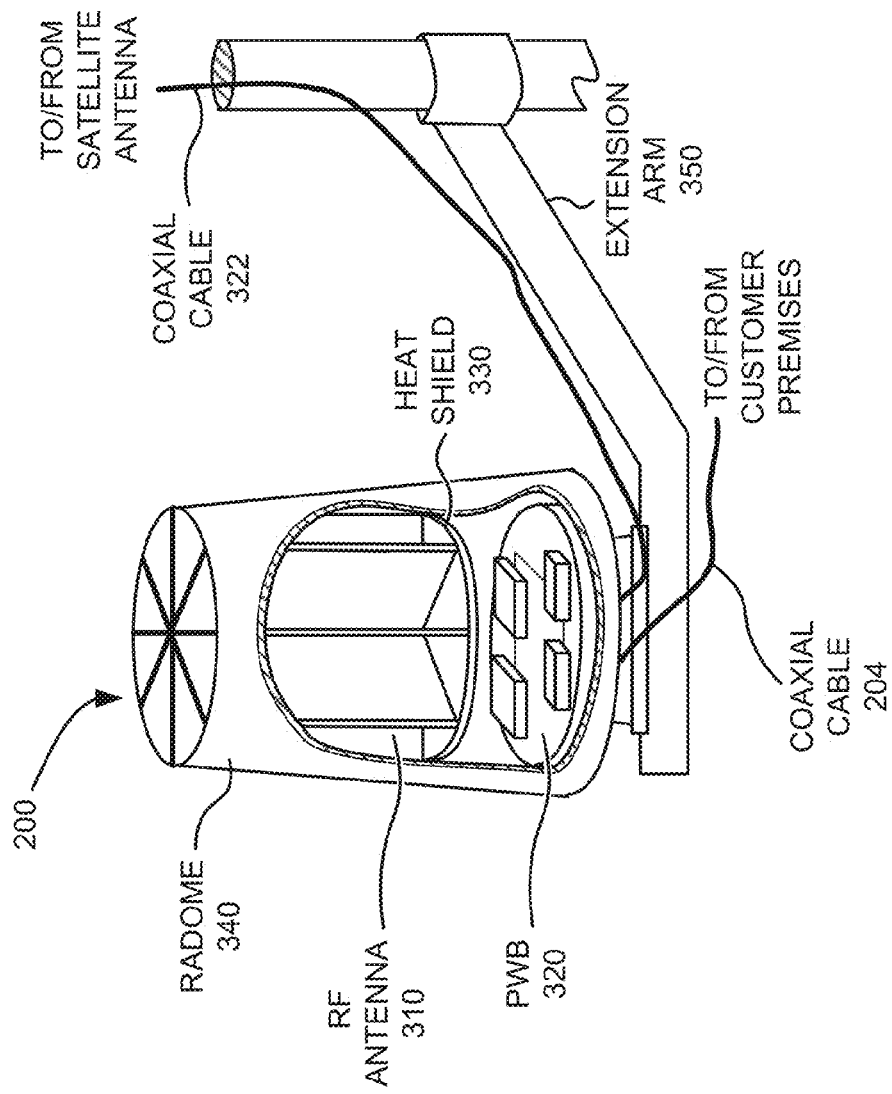
FIG. 3 is a diagram of example components of an outdoor broadband unit of the customer premises network depicted in FIG. 2 according to an implementation described herein.

FIG. 3 is a diagram of example components of outdoor broadband unit 200. As shown in FIG. 3, outdoor broadband unit 200 may include a radio frequency (RF) antenna 310, a printed wiring board (PWB) 320, a heat shield 330, and a radome 340. Outdoor broadband unit 200 may be mounted on an extension arm 350 connected to a pole supporting satellite antenna 202 (not shown).

RF antenna 310 may include an antenna to transmit and/or receive RF signals over the air. RF antenna 310 may, for example, receive RF signals from components on PWB 320 and transmit the RF signals over the air. Also, RF antenna 310 may, for example, receive RF signals over the air and provide the RF signals to components on PWB 320. In one implementation, for example, the components on PWB 320 may communicate with a base station (e.g., eNodeB 140) connected to a network (e.g., LTE network 130) to send and/or receive signals from user devices 270. In one implementation, RF antenna 310 may include a wideband multiple beam antenna, with partially overlapping antenna beams, spanning 360 degrees in azimuth (x-y plane). For example, RF antenna 310 may include between four and eight beams (e.g., to achieve desirable antenna gains and reduction of interference). Additionally, or alternatively, RF antenna 310 may employ two polarizations per beam for 2×2 downlink multiple-input and multiple-output (MIMO) operation.

PWB 320 may include a substrate that mechanically holds and connects various electronic components that are installed onto PWB 320. PWB 320 may include, for example, a laminate structure that routes signals between electronic components that are mounted on PWB 320. Although described as a printed wiring board, PWB 320 could equivalently be referred to as a printed circuit board (PCB), an etched wiring board, or a printed circuit assembly (PCA). PWB 320 may, for example, include components to receive broadband signals via RF antenna 310 and satellite signals from satellite antenna 202 (not shown) via coaxial cable 322 and to combine the broadband and satellite signals to customer premises via coaxial cable 204. Additionally, PWB 320 may receive signals from customer premises via coaxial cable 204 to transmit to via RF antenna 310 to LTE network 130/eNodeB 140.

Heat shield 330 may define a barrier between antenna 310 and PWB 320. Heat shield 330 may include, for example, a heat insulating material. In some implementations, heat shield 330 may also act as a RF shield to shield stray RF signals, produced by components on PWB 320, from antenna 310.

Radome 340 (shown with cut-away view to reveal RF antenna 310, PWB 320, and heat shield 330) may provide a weatherproof enclosure to protect RF antenna 310, PWB 320, and heat shield 330, and/or other components of outdoor broadband unit 200. Radome 340 may include any RF transparent structure that protects components in an outdoor environment. In implementations herein, radome 340 may enclose RF antenna 310, may be integrated with RF antenna 310, or may support external mounting of RF antenna 310.

Although FIG. 3 shows example components of outdoor broadband unit 200, in other implementations, outdoor broadband unit 200 may include fewer components, different components, differently arranged components, and/or additional components than depicted in FIG. 3. Alternatively, or additionally, one or more components of outdoor broadband unit 200 may perform one or more tasks described as being performed by one or more components of outdoor broadband unit 200.

Figure 4:
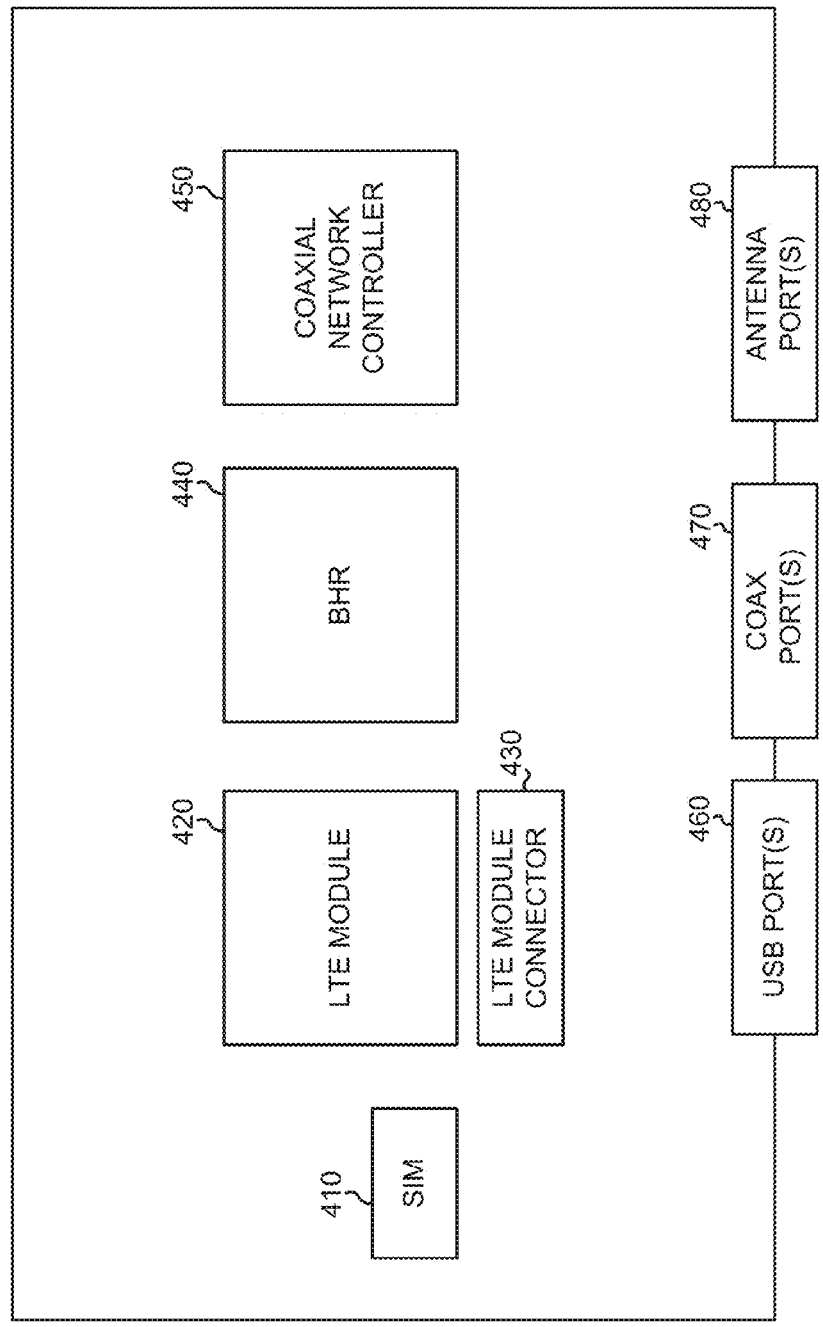
FIG. 4 is a diagram of example components of a printed wiring board of the outdoor broadband unit depicted in FIG. 3.

FIG. 4 is a diagram of example components that may be installed on PWB 320. PWB 320 may include a subscriber identity module (SIM) 410, a LTE module 420, a LTE module connector 430, a broadband home router (BHR) 440, and a coaxial network controller 450. PWB 320 may also include a number of connectors to connect to external devices or systems, such as customer premises network 110, RF antenna 310, and/or satellite antenna 202. The connectors shown in FIG. 4 may include: universal serial bus (USB) port(s) 460, coaxial port(s) 470, and antenna port(s) 480. The components shown in FIG. 4 may be implemented as integrated circuits or other electronic components and illustrate various functionality that may be included on PWB 320. For simplicity, conductive traces connecting the components shown in FIG. 4 are not illustrated.

SIM 410 may include a SIM card or integrated circuit (chip). In general, SIM 410 may function to identify and provide services, such as security services, to the subscriber, associated with the customer premises, when connecting to the LTE network through eNodeB 140. SIM 410 may contain, for example, a unique serial number (such as an integrated circuit card identifier (ICCID)), an internationally unique number associated with customer premises network 110, security authentication and ciphering information, and/or a list of the services to which customer premises network 110 has access.

LTE module 420 may include hardware or a combination of hardware and software having communication capability via an air interface. In other words, LTE module 420 may be a control module for the LTE air interface. For example, LTE module 420 may receive broadband signals and/or voice over Internet protocol (VoIP) signals from eNodeB 140 (e.g., via antenna 310) and transmit broadband signals and/or VoIP signals to eNodeB 140 (e.g., via antenna 310). LTE module 420 may employ frequency division duplex (FDD) and/or time division duplex (TDD) techniques to facilitate downlink and uplink transmissions. In one implementation, LTE module 420 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 420 may select any of the antenna beams, based on real-time measurements, during normal operation. LTE module 420 may connect to antenna 310 through antenna port(s) 490. In one implementation, LTE module 420 may be manufactured as an insertable card, such as a mini-PCI (peripheral component interconnect) card that may be inserted into PWB 320. LTE module connector 430 may include a slot, such as a PCI slot, into which LTE module 420 may be inserted and connected to PWB 320.

In one implementation, LTE module 420 may receive IP data packets originating from a device within a LAN, such as customer premises network 110 and may send the IP data packets toward a destination via an air interface for a WAN, such as network 130. LTE module 420 may also receive, via the air interface for the WAN, other IP data packets, and may send the other IP data packets toward the device within the LAN. LTE module 420 may further receive IP control packets originating from the device within the LAN and implement the IP control packets to initiate a test function or maintenance function for the network device. Additionally, or alternatively, LTE module 420 may receive software updates and other control plane information via the air interface for the WAN.

LTE module connector 430 may include a slot, such as a PCI slot, into which LTE module 420 may be inserted and connected to PWB 320.

BHR 440 may include a device for buffering and forwarding data packets toward destinations. BHR 440 may, for instance, receive data packets from eNodeB 140 (e.g., via LTE module 420) and forward the data packets toward user devices 270. In addition, BHR 440 may receive data packets from user devices 270 (e.g., via local router 260) and forward the data packets toward recipient devices via LTE network 130.

In one implementation, BHR 440 may include a memory to buffer Ethernet traffic between coaxial network controller 450 and LTE module 420. Generally, data rates from the MoCA interface with customer premises network 110 can exceed outgoing data rates over LTE module. Thus, BHR 440 may buffer packets to prevent dropped packets for outbound traffic through outdoor broadband unit 200. BHR 440 may also buffer packets for inbound traffic through outdoor broadband unit 200.

Coaxial network controller 450 may provide an interface for Ethernet over coaxial signals, such as signals transmitted over coaxial cable 204 and into customer premises network 110. Coaxial network controller 450 may act as a bridge device to receive signals from LTE module 420 and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller 450 may be inserted in a Mid-RF MoCA channel that is separate from the 950 MHz to 2150 MHz range of a typical satellite TV system.

PWB 320 may additionally include a number of output ports or physical interfaces. USB port(s) 460 may include ports for connecting to external devices through the USB serial communication standard. USB port(s) 460 may, for example, be used for diagnostic purposes, such as a port through which a technician can connect to PWB 320.

Coaxial port(s) 470 may include an interface for coaxial cables. As previously described, in one implementation, outdoor broadband unit 200 may be connected to a coaxial cable leading to satellite antenna 202 and a coaxial cable (e.g., coaxial cable 204) leading to customer premises network 110. Coaxial network controller 450 may provide a logical interface for coaxial port(s) 470. Antenna port(s) 480 may provide a physical connection to one or more antennas, such as antenna 310. In one implementation, antenna port(s) 480 may include a first connection to a RX (receiving) antenna and a second connection to a RX/TX (receiving/transmitting) antenna.

Although FIG. 4 shows example components of PWB 320, in other implementations, PWB 320 may contain fewer components, different components, differently arranged components, and/or additional components than depicted in FIG. 4. Alternatively, or additionally, one or more components of PWB 320 may perform one or more other tasks described as being performed by one or more other components of PWB 320.

Figure 5:
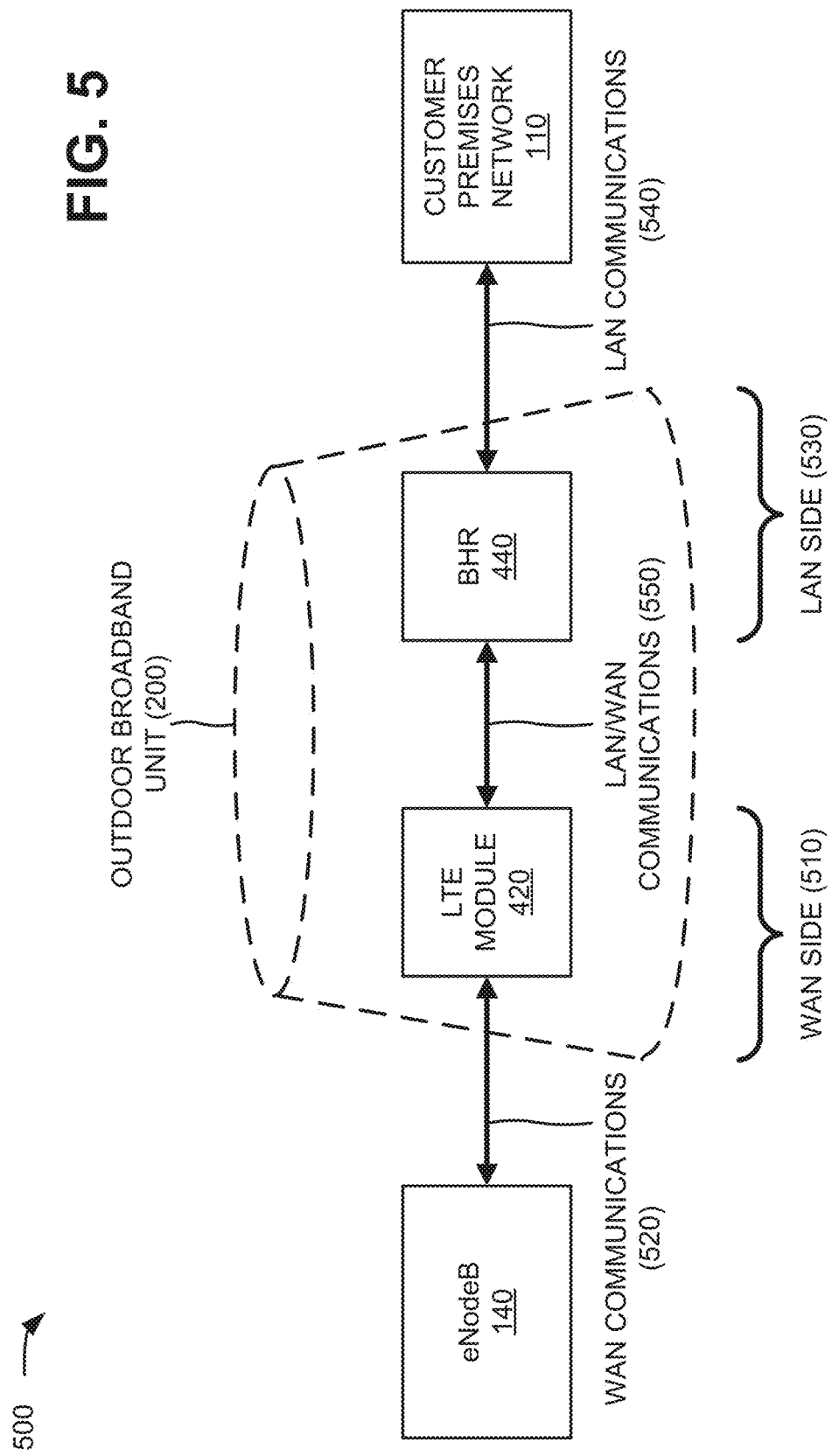
FIG. 5 is a diagram of example operations capable of being performed by an example portion of the system illustrated in FIG. 1.

FIG. 5 is a diagram of example operations capable of being performed by an example portion 500 of environment 100. As shown in FIG. 5, environment portion 500 may include customer premises network 110, eNodeB 140, outdoor broadband unit 200, LTE module 420, and BHR 440. Customer premises network 110, eNodeB 140, outdoor broadband unit 200, LTE module 420, and BHR 440 may include the features described above in connection with one or more of, for example, FIGS. 1-4.

As further shown in FIG. 5, LTE module 420 may make up a WAN side 510 of outdoor broadband unit 200 since LTE module 420 may be associated with a WAN provided via eNodeB 140 and/or network 130 (not shown). In one example implementation, LTE module 420 may be referred to as a "WAN side network device" or a "WAN side component" of outdoor broadband unit 200. eNodeB 140 and LTE module 420 may exchange WAN communications 520. WAN communications 520 may include wireless protocol-based communications associated with the broadband (over LTE) service information exchanged between eNodeB 140 and outdoor broadband unit 200. In one example implementation, WAN communications 520 may include authentication communications (e.g., username and password configurations), provisioning communications associated with outdoor broadband unit 200, etc.

BHR 440 may make up a LAN side 530 of outdoor broadband unit 200 since BHR 440 may be associated with a LAN provided via customer premises network 110. In one example implementation, BHR 440 may be referred to as a "LAN side network device" or a "LAN side component" of outdoor broadband unit 200. Customer premises network 110 and BHR 440 may exchange LAN communications 540. LAN communications 540 may include IP protocol-based communications associated with information exchanged between customer premises network 110 (e.g., user devices 270) and outdoor broadband unit 200. In one example implementation, LAN communications 540 may include requests for video content, requests for audio content, etc.

As further shown in FIG. 5, LTE module 420 and BHR 440 may exchange LAN/WAN communications 550. LAN/WAN communications 550 may include communications that enable outdoor broadband unit 200 to provide a convergence point between wireless protocols (e.g., associated with eNodeB 140) and IP protocols (e.g., associated with user devices 270 of customer premises network 110).

Although FIG. 5 shows example components of environment portion 500, in other implementations, environment portion 500 may include fewer components, different components, differently arranged components, or additional components than depicted in FIG. 5. Alternatively, or additionally, one or more components of environment portion 500 may perform one or more other tasks described as being performed by one or more other components of environment portion 500.

Figure 6:
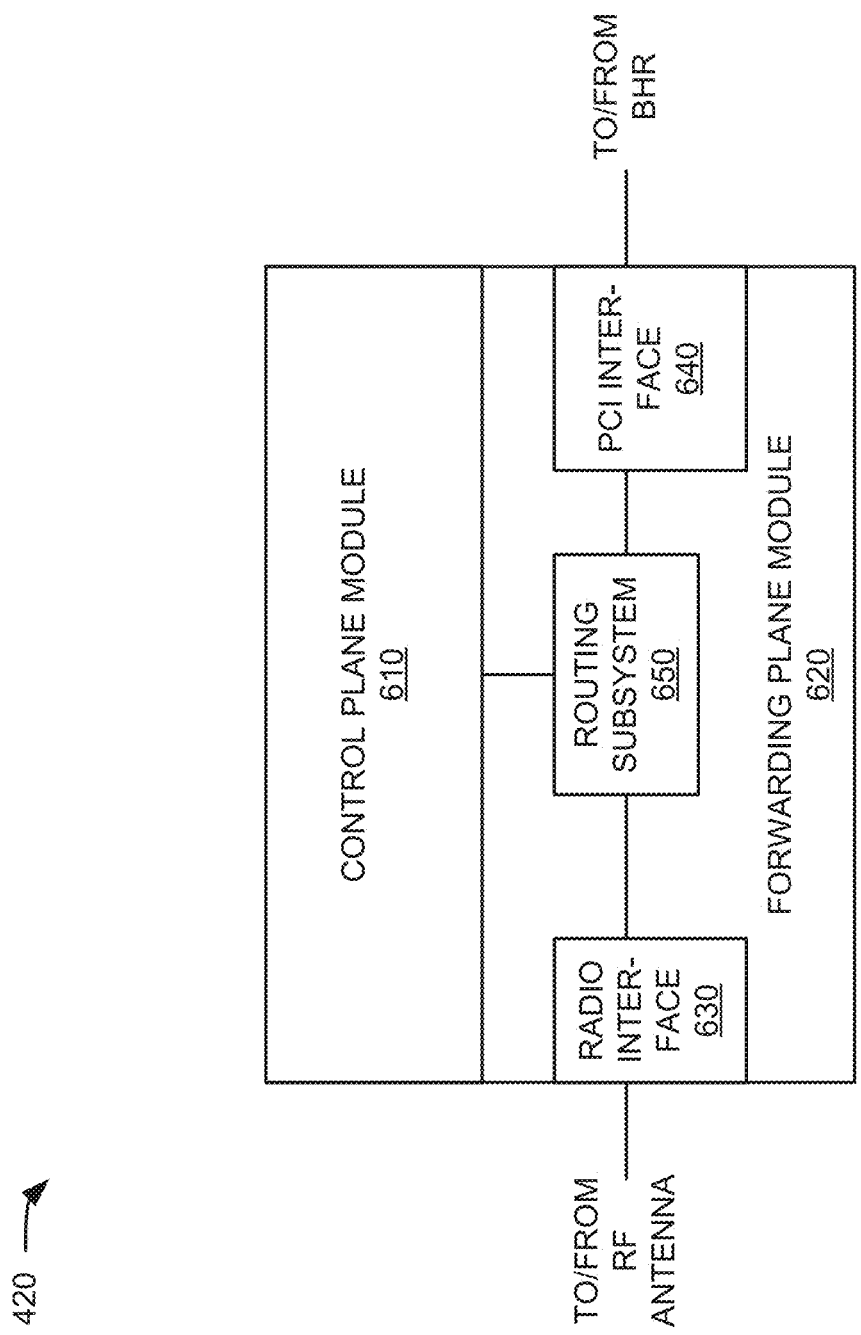
FIG. 6 is a diagram of an example of a component of a Long Term Evolution (LTE) module of the PWB of FIG. 4.

FIG. 6 is a diagram of example functional components of LTE module 420. As shown in FIG. 6, LTE module 420 may include a control plane module 610 and a forwarding plane module 620. Forwarding plane module 620 may include a radio interface 630 and a PCI interface 640 interconnected by a routing sub-system 650. In one implementation, control plane module 610 and user plane module 620 may be included in separate chips on LTE module 420.

Control plane module 610 may perform control operations relating to testing and/or maintenance of LTE module 420 and/or connectivity to LTE network 130. In one implementation, control plane module 610 may receive a command to specify a test mode for testing LTE module 420. In one implementation, control plane module 610 may be configured to receive communications from a test device (e.g., a portable computing device used by a technician) via a separate physical connection, such as a RJ-45 connection to a control plane interface (not shown). In implementations described herein, control plane module 610 may also be configured to receive IP control packets (e.g., to implement test functions) from devices 270 within customer premises network 110 via a MoCA interface. Thus, test functions of control plane module 610 may be accessed and/or implemented without using a separate physical connection to outdoor broadband unit 200.

Forwarding plane module 620 may receive and process user data, such as broadband traffic, for distribution to/from devices (e.g., user devices 270) in customer premises network 110. For example, forwarding plane module 620 may receive data from LTE network 130 via radio interface 630 and may forward the data toward user devices 270 in customer premises network 110 via PCI interface 640. Forwarding plane module 620 (or components within forwarding plane module 620) may be associated with one or more LAN side 530 IP addresses/ports.

Radio interface 630 may provide an air interface with eNodeB 140 to enable WAN communications (e.g., WAN communications 520) with LTE network 130. PCI interface 640 may provide an electrical connection to BHR 440 to enable LAN communications (e.g., LAN communications 540) with customer premises network 110 over a MoCA interface.

Routing subsystem 650 may receive traffic from radio interface 630 and may route the traffic to toward devices in customer premises network 110 (via PCI interface 640) and/or control plane module 610. Additionally, routing subsystem may receive traffic from customer premises network 110 (via PCI interface 640) and rout traffic toward LTE network 130 and/or control plane module 610. For example, routing subsystem 650 may receive, from BHR 440, traffic with an IP address for control plane module 610 and may forward that traffic to control plane module 610 based on the IP address. Thus, LTE module 420 (and broadband home router 200, generally) may support both connection-oriented transport layer routing (such as TCP) and connectionless transport layer routing (such as UDP).

Conventionally, to perform certain maintenance and/or test operations, a test mode command is entered by connecting a test device (e.g., a laptop computer) to a separate interface for control plane module 610. For example, a technician may connect a test device to control plane module 610 via a RJ-45 interface and an Ethernet cable. The technician may then provide appropriate passwords and/or selections to input a test mode command and implement test mode functionality. However, the physical location (e.g., on a roof or side of a building) of outdoor broadband unit 200 may preclude physical attachment to a separate control plane interface.

In implementations described herein, LTE module 420 may include routing subsystem 650 to receive both forwarding plane data and control plane signals via PCI interface 640. Particularly, LTE module 420 may support full IP-based routing between control plane module 610 and forwarding plane module 620. Thus, a test device (e.g., user device 270 or another device) may connect to customer premises network 110 to send control signals (e.g., a test mode command entered by a technician) to control plane module 610 using LAN communications (e.g., LAN communications 540).

Although FIG. 6 shows example functional components of LTE module 420, in other implementations, LTE module 420 may include fewer functional components, different functional components, differently arranged functional components, or additional functional components than depicted in FIG. 6. Alternatively, or additionally, one or more functional components of LTE module 420 may perform one or more other tasks described as being performed by one or more other functional components of LTE module 420.

Figure 7:
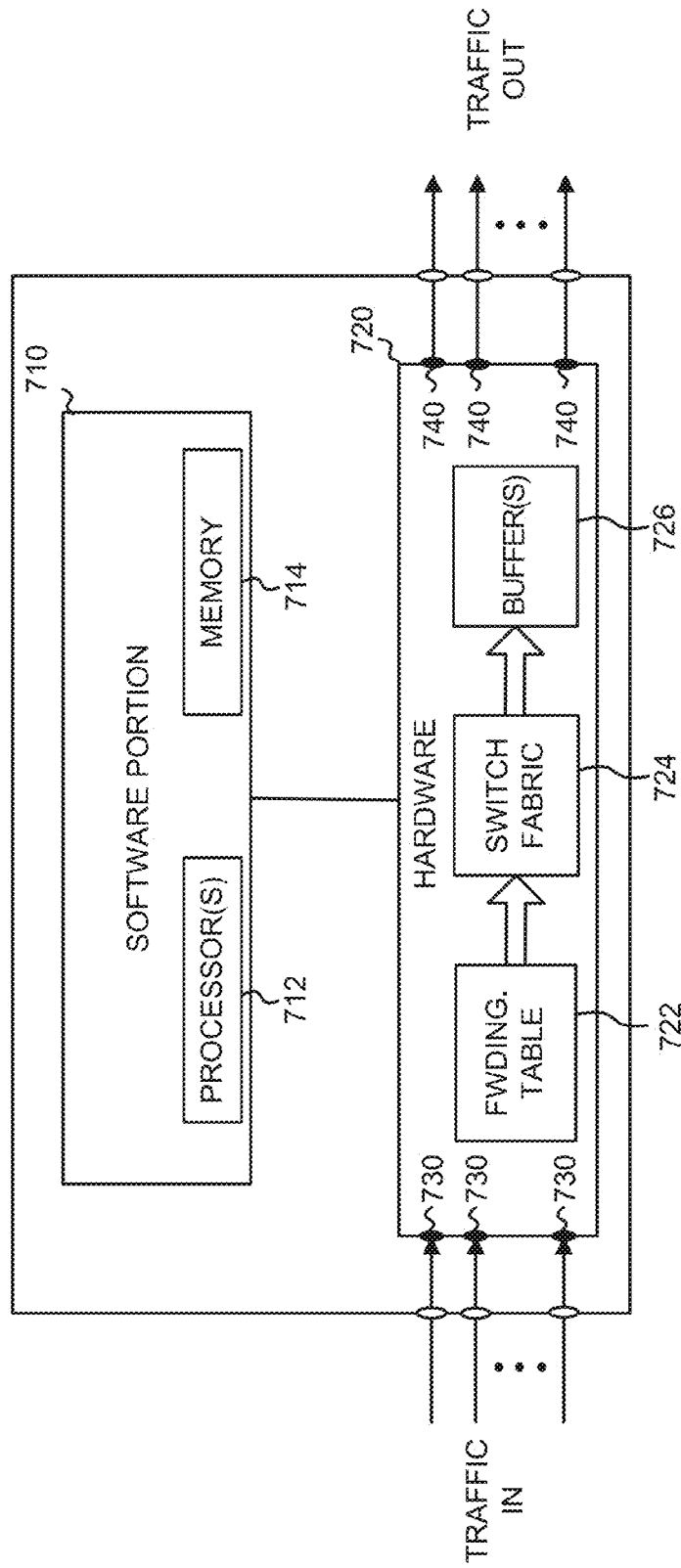
FIG. 7 is a diagram of an example component of broadband home router (BHR) of the PWB of FIG. 4.

FIG. 7 is a diagram of example components of BHR 440. As shown in FIG. 7, BHR 440 may include a software portion 710 and a hardware portion 720. Software portion 710 may include software designed to control BHR 440. Software portion 710 may, for example, implement an operating system for BHR 440 and may execute processes designed to implement the network protocols used by BHR 440. Software portion 710 may control hardware portion 720 and provide an interface for user configuration of BHR 440.

Software portion 710, although shown as a single abstract block 710 in FIG. 7, may be implemented through, for example, one or more general purpose processor(s) 712 and one or more computer memories 714. Processor(s) 712 may include processors, microprocessors, or other types of processing logic that may interpret and execute instructions. Computer memory 714 (also referred to as computer-readable media herein) may include random access memory (RAM), read-only memory (ROM), or another type of storage device that may store information and instructions for execution by processor(s) 712.

As described herein, BHR 440 may perform certain operations in response to processor(s) 712 executing software instructions contained in a computer-readable medium, such as memory 714. A computer-readable medium may be defined as a non-transitory memory device. A memory device may include memory space within a single physical memory device or spread across multiple physical memory devices. The software instructions may be read into memory 714 from another computer-readable medium or from another device. The software instructions contained in memory 714 may cause processor(s) 712 to perform processes described herein. Alternatively, hardwired circuitry may be used in place of or in combination with software instructions to implement processes described herein. Thus, implementations described herein are not limited to any specific combination of hardware circuitry and software.

Hardware portion 720 may include circuitry for efficiently processing traffic (such as packetized traffic) received by network BHR 440. Hardware portion 720 may include, for example, logic, such as an application specific integrated circuit (ASIC), a field programmable gate array (FPGA), and/or a ternary content-addressable memory (TCAM). Hardware portion 720 may, for example, receive incoming packets, extract header information for the packets, and process the packets based on the extracted header information.

Hardware portion 720 may particularly include a forwarding table 722, a switch fabric 724, and one or more buffers 726. Forwarding table 722 may be determined based on routing tables maintained by software portion 710. Forwarding table 722 may be used to lookup the appropriate output port for incoming packets. Forwarding table 722 may be updated based on the network protocols implemented by software portion 710. Based on the result of the lookup in forwarding table 722, packets may be switched to appropriate output ports through switch fabric 724.

Buffer 726 may provide a buffer for queuing incoming packets. If packets arrive simultaneously, one or more of the packets may wait in the buffer until higher priority packets are processed and/or transmitted. Furthermore, because some interfaces may process traffic faster than others, buffer 726 may queue incoming packets that are receive via a higher-speed interface (e.g., a MoCA interface on LAN side 530) for forwarding on a slower-speed interface (e.g., an air interface on WAN side 510). In one particular implementation, buffer 726 may buffer incoming packets received from customer premises network 110 (e.g., via the MoCA interface) until LTE module 420 can process them to be transmitted to LTE network 130 (e.g., via the air interface).

BHR 440 may also include ports for receiving and transmitting packets. A number of input ports 730 and output ports 740 are particularly shown for BHR 440. Packets received at one of input ports 730 may, based on the application of forwarding table 722 and switch fabric 724, be output at an appropriate one or more of output ports 740.

Although BHR 440 is shown as including a software portion 710 and a hardware portion 720, BHR 440 may, in some implementations, be implemented entirely through hardware. In some implementations, BHR 440 may include fewer, different, differently arranged, or additional components than depicted in FIG. 7. Alternatively, or additionally, one or more components of BHR 440 may perform one or more tasks described as being performed by one or more other components of BHR 440.

As previously mentioned, BHR 440 may maintain a routing table. The routing tables may, for example, be maintained by software portion 710 and used to create forwarding table 722.

FIG. 8 is a diagram illustrating an example portion of a routing table 800, such as a routing table maintained by BHR 440. Each row of routing table 800 may include a number of fields. Four fields are shown in example routing table 800: a LAN destination IP address field 810, a LAN port field 820, a WAN destination IP address field 830, and a WAN port field 840.

LAN destination IP address field 810 may include an address or identifier for the destination of an incoming packet. The destination may be specified as, for example, an IPv4 (Internet Protocol, version 4) or IPv6 (Internet Protocol, version 6) address. IP addresses in LAN destination IP address field 810 may remain associated with a particular component/device. LAN port field 820 may include field for a physical or logical port associated with an IP addresses in LAN destination IP address field 310.

WAN destination IP address field 830 may include an address or identifier for the destination of an incoming packet. The destination may be specified as, for example, an IPv4 or IPv6 address. IP addresses in WAN destination IP address field 830 may be assigned, for example, by LTE network 130 during initiation of a session. Thus, IP addresses in WAN destination IP address field 830 may change (e.g., for different sessions) over time. WAN port field 840 may include field for a physical or logical port associated with an IP addresses in WAN destination IP address field 830.

Although FIG. 8 shows example fields of routing table portion 800, in other implementations, routing table portion 800 may include fewer fields, different fields, or additional fields than depicted in FIG. 8.

Figure 9:
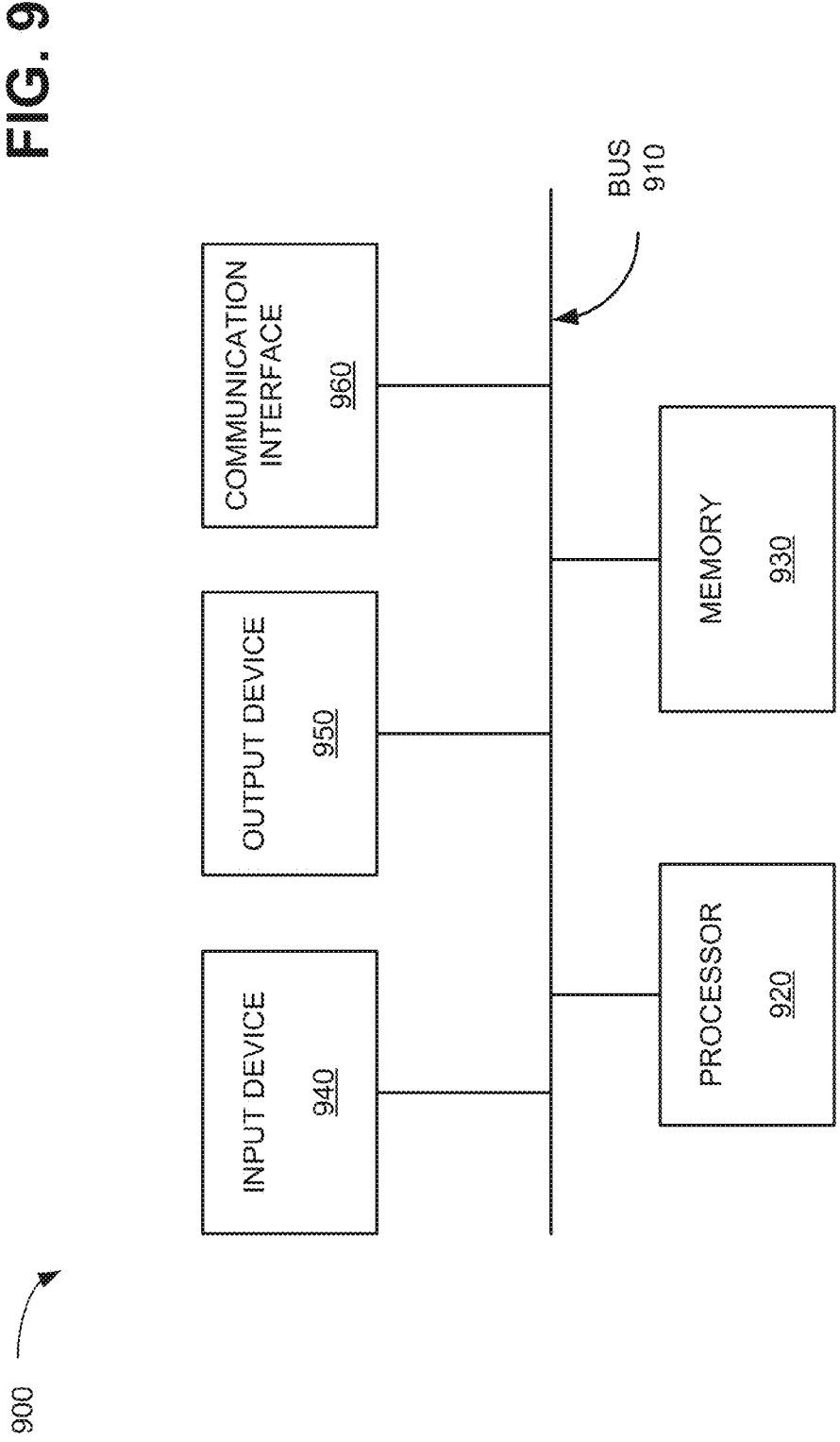
FIG. 9 is a diagram of example components of a device that may correspond to one of the devices of the system of FIG. 1 or the customer premises network of FIG. 2.

FIG. 9 is a diagram of example components of a device 900 that may correspond to one of the devices of system 100 and/or customer premises network 110 (e.g., SIM 410, LTE module 420, BHR 440, coaxial network controller 450, local router 260, etc.). As shown, device 900 may include a bus 910, a processor 920, a memory 930, an input device 940, an output device 950, and a communication interface 960.

Bus 910 may permit communication among the components of device 900. Processor 920 may include one or more processors and/or microprocessors that interpret and execute instructions. Additionally or alternatively, processor 920 may be implemented as or include one or more ASICs, FPGAs, or the like. Memory 930 may include a RAM or another type of dynamic storage device that stores information and instructions for execution by processor 920, a ROM or another type of static storage device that stores static information and instructions for the processor 920, and/or some other type of magnetic or optical recording medium and its corresponding drive for storing information and/or instructions.

Input device 940 may include a device that permits an operator to input information to device 900, such as a keyboard, a keypad, a mouse, a pen, a microphone, a touch screen, one or more biometric mechanisms, and the like. Output device 950 may include a device that outputs information to the operator, such as a display, a speaker, etc.

Communication interface 960 may include any transceiver-like mechanism that allows device 900 to communicate with other devices and/or systems. For example, communication interface 960 may include mechanisms for communicating with other devices, such as devices of FIG. 1 or FIG. 2.

Device 900 may perform certain functions in response to processor 920 executing software instructions contained in a computer-readable medium, such as memory 930. The software instructions may be read into memory 930 from another computer-readable medium or from another device via communication interface 960. The software instructions contained in memory 930 may cause processor 920 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 9 illustrates example components of device 900, in some implementations, device 900 may include fewer components, different components, differently arranged components, or additional components than those depicted in FIG. 9. Additionally, or alternatively, one or more components of device 900 may perform one or more tasks described as being performed by one or more other components of device 900.

FIG. 10 is a flow diagram illustrating a process 1000 for routing traffic between a WAN air interface and a LAN interface according to an implementation described herein. In one implementation, process 1000 may be performed by outdoor broadband unit 200. In other implementations, some or all of process 1000 may be performed by another device or a group of devices separate from and/or possibly remote from outdoor broadband unit 200 and/or including outdoor broadband unit 200.

Process 1000 may include receiving an IP data packet originating from a device within a LAN (block 1010), and sending, by a forwarding plane, the IP data packet toward a destination via an air interface for a WAN (block 1020). For example, outdoor broadband unit 200 (e.g., forwarding plane module 620 of LTE module 420) may receive and process user data, such as broadband traffic, from devices (e.g., devices 270) in customer premises network 110 for distribution to LTE network 130. Forwarding plane module 620 may receive data from customer premises network 110 via PCI interface 640 and may forward the data toward eNodeB 140 via radio interface 630.

Process 1000 may also include receiving an IP control packet originating from the device within the LAN (block 1030), and implementing, within a control plane, the IP control packet to initiate a test function for the network device (block 1040). For example, outdoor broadband unit 200 (e.g., control plane module 610 of LTE module 420) may perform control operations relating to testing and/or maintenance of LTE module 420 and/or connectivity to LTE network 130. In one implementation, control plane module 610 may receive a command to specify a test mode for testing LTE module 420. Control plane module 610 may receive IP control packets (e.g., to implement test functions) from devices 270 within customer premises network 110 via a MoCA interface. Thus, test functions of control plane module 610 may accessed and/or implemented without using a separate physical connection to outdoor broadband unit 200.

Process 1000 may additionally include receiving, via the air interface for the WAN, another IP data packet (block 1050), and sending, by the forwarding plane, the other IP data packet toward the device within the LAN (block 1060).

For example, outdoor broadband unit 200 (e.g., forwarding plane module 620 of LTE module 420) may receive and process user data, such as broadband traffic, for distribution to devices (e.g., user devices 270) in customer premises network 110. For example, forwarding plane module 620 may receive data from LTE network 130 via radio interface 630 and may forward the data toward user devices 270 in customer premises network 110 via PCI interface 640.

Systems and/or methods described herein may include an outdoor broadband unit that implements full IP-based routing between a WAN-side interface (e.g., for LTE) and a LAN-side interface (e.g., using MoCA protocol). The outdoor broadband unit may maintain a routing table for all connections through an internal routing system based on matching between WAN-side IP addresses and/or ports and LAN-side IP addresses and/or ports. The systems and/or methods may support both connection-oriented and connectionless transport layer routing.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 10, the order of the blocks may be modified in other implementations. Further, non-dependent blocks may be performed in parallel.

Also, certain portions of the implementations may have been described as a "component" or "module" that performs one or more functions. The terms "component" and "module" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by an outdoor broadband unit, the method comprising:
   receiving, by a network device within the outdoor broadband unit and via Ethernet over coaxial cable signals, Internet Protocol (IP) data traffic originating from a device within a local area network (LAN);

buffering, in a memory within the outdoor broadband unit, the IP data traffic;

sending, by a forwarding plane module of the network device, the IP data traffic toward a destination via an air interface for a wide area network (WAN);

receiving, by the network device and via different Ethernet over coaxial cable signals, IP control traffic originating from the device within the LAN, wherein the IP control traffic includes a test mode command to access a control plane module of the network device; and implementing, within the control plane module of the network device, instructions in the IP control traffic to initiate a test function for the network device.

2. The method of claim 1, further comprising:

receiving, via the air interface for the WAN, other IP data traffic; and sending, by the forwarding plane module of the network device, the other IP data traffic toward the device within the LAN.

3. The method of claim 1, wherein the network device is a Long Term Evolution (LTE) module.

4. The method of claim 1, wherein the receiving the IP data traffic and the receiving the IP control traffic are conducted using the same mechanical interface.

5. The method of claim 4, wherein the mechanical interface is a peripheral component interconnect (PCI) interface.

6. The method of claim 1, wherein the IP control traffic includes:

a Transmission Control Protocol (TCP) header, or a User Datagram Protocol (UDP) header.

7. The method of claim 1, wherein the LAN and the device within the LAN conform to Multimedia over Coax Affiance (MoCA) standards.

8. A non-transitory computer-readable medium, comprising:

one or more instructions that, when executed by one or more processors of a network device within an outdoor broadband unit, cause the one or more processors to:

receive, via Ethernet over coaxial cable signals, Internet Protocol (IP) data traffic originating from a device within a local area network (LAN);

buffer the IP data traffic;

send the IP data traffic toward a destination over an air interface for a wide area network (WAN);

receive, via different Ethernet over coaxial cable signals, IP control traffic originating from the device within the LAN, wherein the IP control traffic includes a test mode command to access a control plane module of the network device; and implement, by the control plane module, instructions in the IP control traffic to initiate a test function for the network device.

9. The non-transitory computer-readable medium of claim 8, further comprising:

one or more instructions that, when executed by the one or more processors of the network device within the outdoor broadband unit, cause the one or more processors to:

receive, via the air interface for the WAN, other IP data traffic; and send the other IP data traffic toward the device within the LAN.

10. The non-transitory computer-readable medium of claim 8, wherein the one or more instructions, when executed by one or more processors of a network device within the outdoor broadband unit, cause the one or more processors to:

receive the IP data traffic and receive the IP control traffic using the same mechanical interface.

11. The non-transitory computer-readable medium of claim 10, wherein the mechanical interface is a peripheral component interconnect (PCI) interface.

12. The non-transitory computer-readable medium of claim 8, wherein the IP control traffic includes an IP packet including:

a Transmission Control Protocol (TCP) header, or a User Datagram Protocol (UDP) header.

13. The non-transitory computer-readable medium of claim 8, wherein LAN conforms to Multimedia over Coax Affiance (MoCA) standards.

14. The non-transitory computer-readable medium of claim 8, wherein the air interface for the WAN includes a Long Term Evolution (LTE) interface.

15. An outdoor broadband unit for customer premises, comprising:

a radome including a radio frequency (RF) transparent structure; and a printed wiring board within the radome to:

receive, via Ethernet over coaxial cable signals, Internet Protocol (IP) data traffic originating from a device within a local area network (LAN) for the customer premises, buffer the IP data traffic, send the IP data traffic toward a destination over an air interface for a wide area network (WAN), receive, via different Ethernet over coaxial cable signals, IP control traffic originating from the device within the LAN, wherein the IP control traffic includes a test mode command to access a control plane module of the outdoor broadband unit, and implement, within the control plane module, instructions in the IP control traffic to initiate a test function for the outdoor broadband unit.

16. The outdoor broadband unit of claim 15, wherein the printed wiring board is further to:

receive, via the air interface for the WAN, other IP data traffic; and send the other IP data traffic toward the device within the LAN.

17. The outdoor broadband unit of claim 15, wherein the printed wiring board further comprises:

a mechanical interface to receive both the IP data traffic and the IP control traffic.

18. The outdoor broadband unit of claim 17, wherein the mechanical interface includes a peripheral component interconnect (PCI) interface.

19. The outdoor broadband unit of claim 15, wherein the IP control traffic includes an IP packet including:

a Transmission Control Protocol (TCP) header, or a User Datagram Protocol (UDP) header.

20. The outdoor broadband unit of claim 15, wherein the LAN conforms to Multimedia over Coax Affiance (MoCA) standards, and wherein the air interface for the WAN includes a Long Term Evolution (LTE) interface.

* * * * *